United States Patent [19]

Colautti et al.

[11] Patent Number: 4,509,382
[45] Date of Patent: Apr. 9, 1985

[54] PRELOADED SCREW ACTUATOR

[75] Inventors: Albert J. Colautti, Windsor, Canada; Hans J. Borlinghaus, Utica, Mich.

[73] Assignee: General Motors Corporation, Detroit, Mich.

[21] Appl. No.: 478,660

[22] Filed: Mar. 25, 1983

[51] Int. Cl.³ .............................................. F16H 1/20
[52] U.S. Cl. ............................... 74/424.8 R; 74/89.15; 248/405
[58] Field of Search ................. 384/220, 420; 308/DIG. 8; 248/405; 74/89.15, 424.8 R; 192/141, 143

[56] References Cited

U.S. PATENT DOCUMENTS

| 2,072,468 | 2/1937 | Saur et al. | 74/89.15 |
| 2,462,011 | 2/1949 | Thiry | 384/220 |
| 2,841,996 | 7/1958 | Jamieson et al. | 74/89.15 |
| 2,872,256 | 2/1959 | Thomson | 384/420 |
| 2,893,470 | 7/1959 | Peller | 248/405 |
| 3,212,747 | 10/1965 | Hansen et al. | 74/424.8 R |
| 3,218,021 | 11/1965 | Michalshi | 248/405 |
| 3,445,143 | 3/1969 | Swenson | 384/420 |
| 3,732,744 | 5/1973 | Rowland | 74/424.8 R |
| 4,217,813 | 8/1980 | Bradley | 74/424.8 R X |
| 4,284,935 | 8/1981 | March et al. | 318/280 |

Primary Examiner—Allan D. Herrmann
Assistant Examiner—Shirish Desai
Attorney, Agent, or Firm—Dean L. Ellis

[57] ABSTRACT

An automotive vehicle power-actuated seat adjuster assembly includes a screw type height adjustment apparatus employing a nut held axially but rotatable under applied torque within spaced antifriction bearings, one of which bearings is an element molded of low friction polymeric material formed with elastic thrust absorbing legs deflectable to provide up to a predetermined amount of axial preload in the screw and nut elements.

5 Claims, 6 Drawing Figures

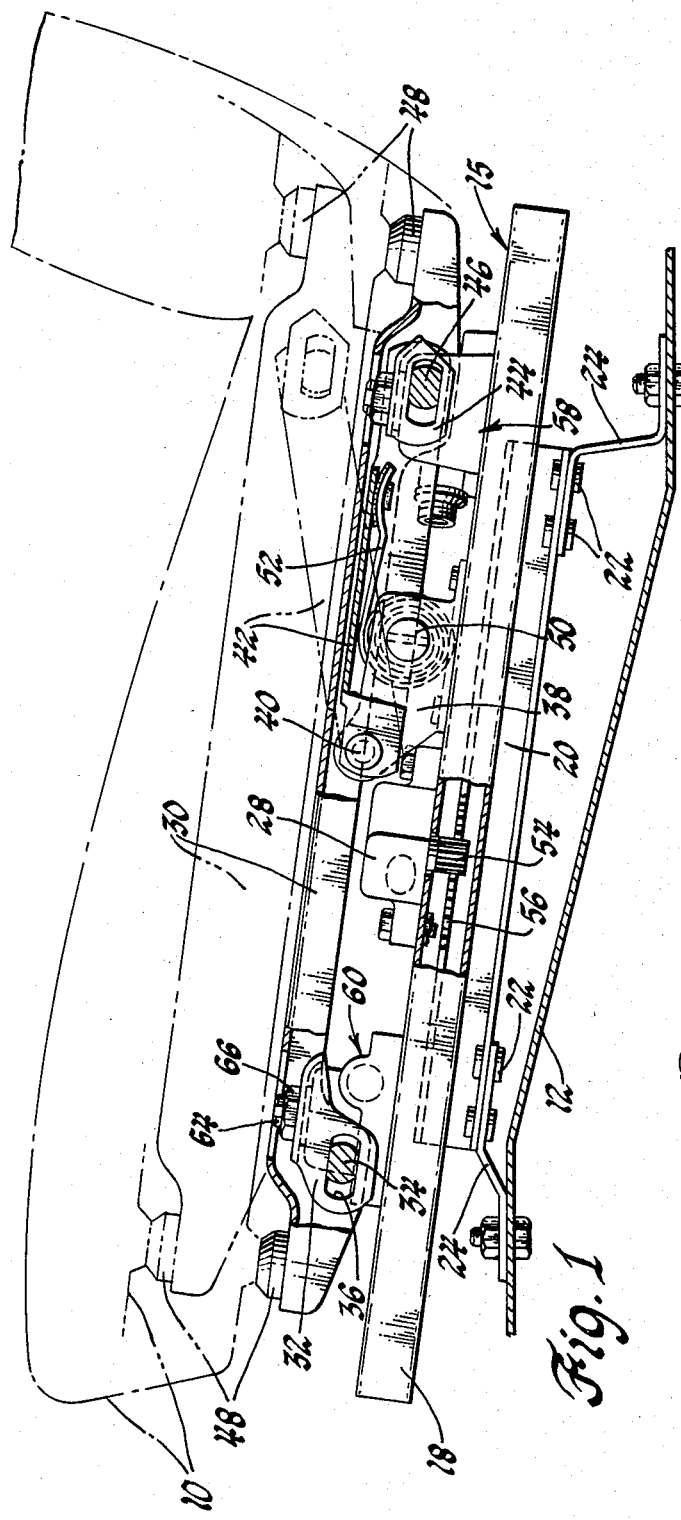
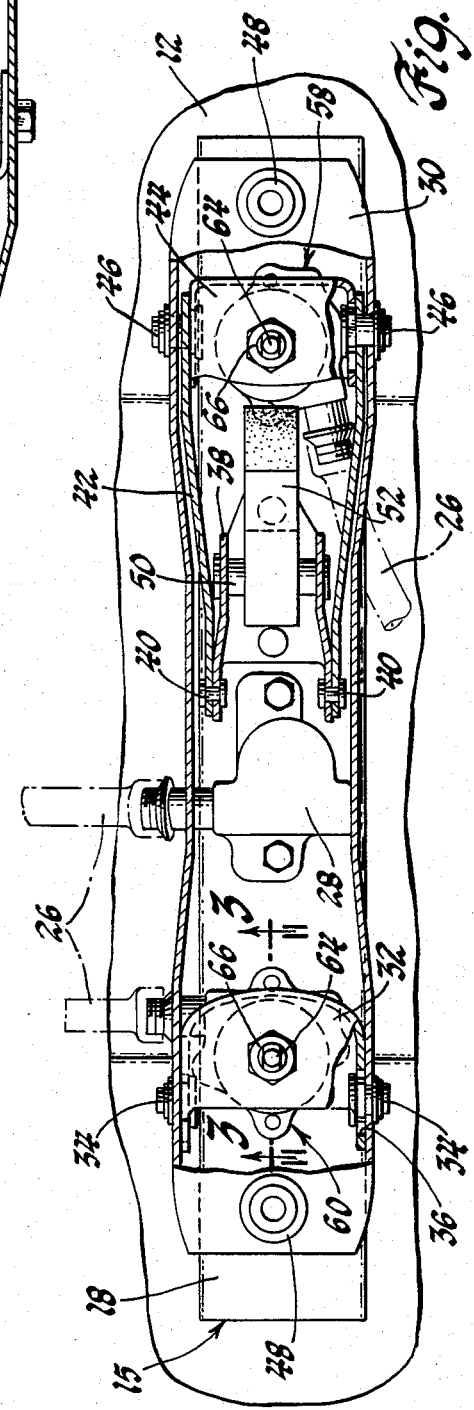

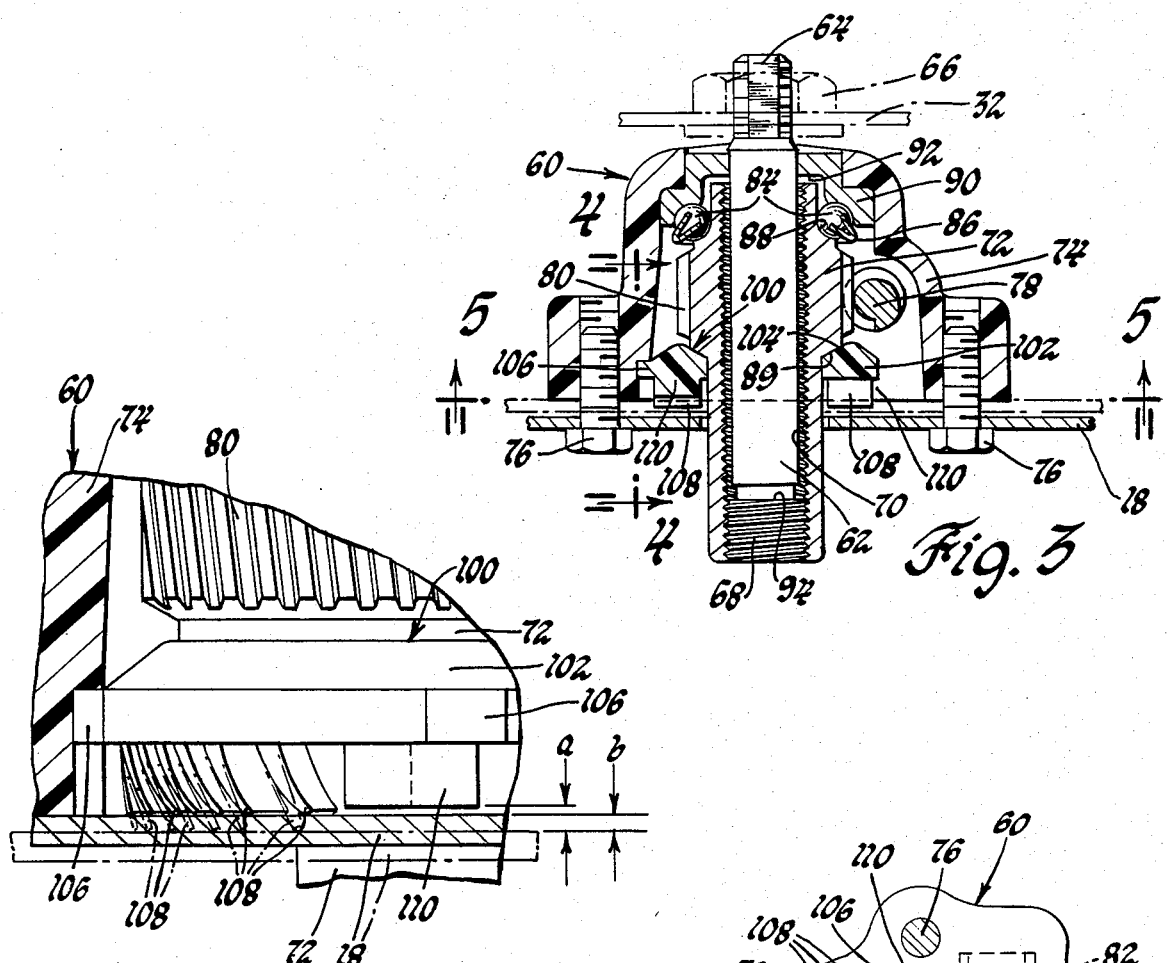
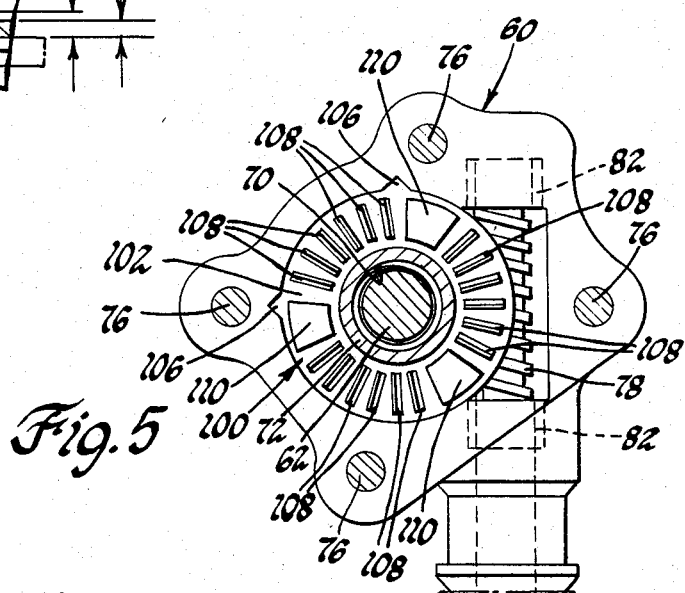
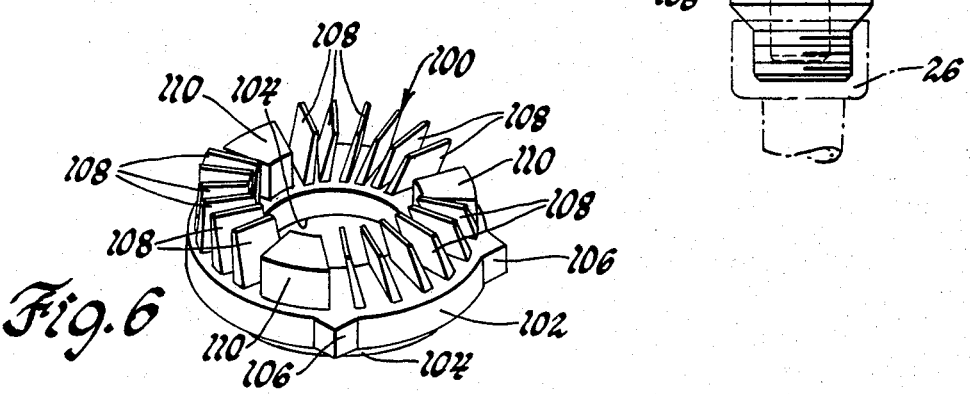

PRELOADED SCREW ACTUATOR

This invention relates to mechanical motion converting apparatus such as screw and nut type actuators and the like and to bearing combinations useful in such apparatus and in similar devices.

The invention contemplates improvements in screw and nut actuators for automotive seat adjuster assemblies employed for selected adjustment of the vehicle seat either fore and aft, up and down, etc., upon energization of an electric motor or like drive means. In such assemblies, it is often preferred to mount the seat directly upon an output screw element meshed with a nut held axially fixed but rotatable on spaced bearings within a housing, whereby drive torque applied to the nut causes selected extension and retraction of the screw and adjustment of the seat position. The current trend toward smaller and more aerodynamically shaped vehicle bodies requires limiting the size, particularly the height, of the adjuster apparatus and the vehicle seat in order to provide increased head and other room for the vehicle occupant.

Such design emphasis has led to the instant improvements in actuating apparatus wherein the basic elements necessary to a satisfactory screw or like type actuator are more compactly designed and organized with reduced cost. In more specific aspects, the invention provides an actuator of the screw and nut variety wherein the force or motion converting nut or screw element is included within a combination featuring bearings adapted to sustain the thrust or axial force imposed on the actuator by the load of the seat occupant or by drive torque utilized to adjust his position, such combination in total exhibiting highly compact physical organization and reduced cost of manufacture. Included within such organization of elements is a one piece molded bearing fabricated of a low friction polymer such as a Teflon-impregnated acetal, nylon or like material adapted to engage directly with a bearing surface of the screw or nut and which may sustain all radial, thrust or torque forces imposed by the same. In line with the frequent need to install within such a combination some means operative to keep the various elements tightly engaged against play or lash for precision of operation and long life, the instant invention provides a molded bearing comprising a main bearing portion engaged with the screw or nut element and a further portion integral therewith which acts as an elastic medium engaged on the actuator housing or otherwise grounded and which is stressed up to a predetermined amount, thereby to preload the combination with axial force against lash. In the interests of long life and also some latitude in the selection of polymer material to accomplish the basic antifriction bearing or support function, the elastic portion of the bearing element co-acts with force limiting abutments which permits the required amount of elastic deflection in the bearing for proper preload, but which prevents undue such deflection and stress under the large loads which will normally be imposed on the bearing element during routine operation of the adjuster or surrounding apparatus.

In a specific embodiment, maximum strides in low cost manufacture and highly compact organization of the bearing combination are made with a molded polymeric bearing element including a tough, rigid substantial bodied main bearing portion having depending therefrom a series of angularly spaced radially oriented legs which engage directly with a grounded surface and which yields under an axial force during assembly of the total combination to provide the necessary assembly preload. In the specific embodiment, the bearing element acts as a radial and thrust bearing accommodating relatively without friction the rotation of an engaged actuator screw or nut element under drive torque thereon while itself remaining nonrotatable yet axially deflectable to preload the rotating element onto an opposite housing surface or bearing against lash.

The abutment stops may include means arranged to engage the main bearing portion of the bearing element with the actuator housing or a support surface upon deflection of the yieldable bearing portion within a range up to some predetermined maximum related to the stress strain characteristics or elasticity of the antifriction polymeric material selected. Further, the abutment stops may be integrally fabricated or molded within the polymeric bearing element for low cost and simplicity in line with the major objects of the invention.

Such objects and other features and advantages of the invention will be readily apparent from the following description and from the drawings wherein:

FIG. 1 is a partially broken away side elevational view of an automotive vehicle seat adjuster apparatus including an actuator in accordance with this invention and illustrating different seat heights in solid and broken lines;

FIG. 2 is a partially broken away plan view of the seat adjuster;

FIG. 3 is an enlarged sectional view of the actuator taken generally along the plane indicated by lines 3—3 of FIG. 2 showing the same partially installed in the seat adjuster in solid lines and fully installed in broken lines;

FIG. 4 is an enlarged fragmentary view of a portion of the actuator taken generally along the plane indicated by lines 4—4 of FIG. 3 and showing the same partially installed in broken lines and fully installed in solid lines;

FIG. 5 is a bottom view of the actuator taken generally along the plane indicated by lines 5—5 of FIG. 3; and FIG. 6 is a perspective view of the polymeric resilient bearing in accordance with the invention.

Referring now to FIG. 1 of the drawings the same illustrates generally conventional apparatus adjustably mounting an automotive vehicle passenger seat, indicated in phantom at 10, within the passenger compartment of a vehicle body and particularly upon the underlying floor pan of such body indicated at 12. The seat adjuster apparatus is designated generally as 15 and as is well known may include slidable interfitted elongated channels or slide members, an upper one thereof designated 18 being slidably received over a lower stationary slide designated 20. Lower slide 20 has riveted thereto as at 22 at forward and rearward portions thereof a pair of mounting brackets 24 which are bolted to the floor pan 12.

Seat adjuster 15 is of the power operated type wherein in addition to the usual adjustment capability for the vehicle occupant fore and aft by sliding of upper slide 18 on lower slide 20, there are also provisions for adjustment of the vehicle seat 10 vertically relative to floor pan 12. Such may be done purely rectilinearly as indicated in FIG. 1 or optionally in a tilting mode where a forward or rearward edge of the seat is adjusted independently of the opposite edge. Such selected adjustment is to be accomplished by a series of power actuators each driven selectively by a reversible dc electric motor drive unit, not shown, connected with the seat adjuster 15 by a plurality of flexible torque carrying drive cables, indicated at 26 in FIG. 2.

More particularly, seat adjuster 15 conventionally includes a first or fore and aft actuator assembly 28 bolted or otherwise affixed to the top surface of upper slide 18. A seat mounting plate 30 is posed above upper slide 18 and, referring to FIG. 2, is again of generally channel like construction provided at its forward end with a first rocker member 32 extending between opposite flanges of plate 30 and having turned flanges thereof rotatably mounted thereto as by headed studs 34. Apertures 36 in such rocker flanges are of elongated double "D" shape to nonrotatably but slidably receive such studs 34 and permit relative longitudinal displacement of the plate 30 relative to upper slide 18. Adjacent to its rearward end, upper slide 18 has affixed thereto an idler link assembly comprising an upwardly opening, generally U-shaped bracket 38 riveted to the upper slide and having pivotally mounted to the legs thereof at 40 one end of an elongated idler link 42 of downwardly opening channel construction. Received between the legs of link 42 adjacent its rearward end is a second rocker member 44 structured similar to bracket 32 and having opposite flanges which receive slidably but nonrotatably in apertures thereof further pivot studs 46 rotatably mounted within aligned apertures in both the link 42 and the rearward margins of the flanges of the plate 30. The seat bottom of seat 10 is suitably bolted or otherwise affixed to plate 30 at various locations indicated at 48. Thus, the seat adjuster 15 comprises in well known manner a swingable link structure operative to provide purely vertical rectilinear seat adjustment, as indicated by broken lines in FIG. 1, by coordinated raising or lowering in unison of rockers 32 and 44 relative to upper slide 18, or selected clockwise or counterclockwise tilting of the seat 10, relative to upper slide 18 by raising or lowering of one rocker 32 or 44 independently of the other such rocker. A clock type coiled counterbalance spring 52 is wound about a pin 50 on bracket 38 and bears a free end thereof against the under surface of link 42 to bias the same counterclockwise, FIG. 1, about pivot 40 to assist adjustment against the weight of the seat 10 and its occupant.

Fore and aft adjustment in seat adjuster 15 is accomplished by first actuator 28 of known variety including a housing bolted to the upper slide 18 and having projecting through an aperture thereof an output pinion 54 engaged with rack teeth 56 suitably formed within a slot in the upper web of lower slide 20. Selected energization of the actuator in either direction of pinion rotation serves to translate upper slide 18 and its superposed members fore or aft along with seat 10 to a selected position of the latter on floor pan 12.

A pair of generally identical screw actuators are provided at the forward and rear ends of plate 30 to provide the required vertical or tilting adjustment of seat 10. As best viewed in FIG. 1, these actuators, designated 58 and 60, are, in accordance with the invention, conceived to accomplish maximum reduction in the overall size or vertical distance taken by the actuator between the upper surface of upper slide 18 and the superposed plate 30. Thus, the overall height of the seat adjuster 15 is minimized to provide increased room in the vehicle passenger compartment for the vehicle occupant. These actuators are generally identical and accordingly this description will proceed with particular reference to the forward actuator designated generally as 60.

Referring to FIGS. 2 and 3, actuator 60 is generally of the screw and nut variety employing as its output element an elongated shaft 62 provided at its upper exposed end with a flatted and threaded end 64 received within a central aperture of the web of rocker 32 and held thereto by a nut 66. At its other end the shaft is provided with a screw thread 68 engaged with like internal threads 70 of a rotary nut 72 of elongated configuration. Nut 72 is axially held fixed but rotatable within a housing 74 molded of a suitable structurally rigid polymer material providing a large internal cavity and adapted to be affixed to the upper surface of upper slide 18 by threading into bosses thereof of screws 76.

Referring also to FIG. 5, nut 72 is adapted to be driven rotatably in either direction for extension and retraction of shaft 62 vertically therewithin by selected application of drive torque to a worm gear set including a worm shaft 78 rotatably mounted in suitable bearings 82 in housing 74. The worm gear 80 is formed integrally as a portion of nut 72. One of the flexible drive cables 26 is suitably received to drive the worm shaft 78.

Nut 72 is combined in accordance with principles of this invention within housing 74 with bearing apparatus including adjacent its upper end, a generally conventional ball bearing having balls 84 held by a separator 86 and seated between an upper bearing surface 88 of the nut and an upper race 90 seated in the upper margins of housing 74. Race 90 includes an upper annular stop surface 92 engageable with a shoulder 94 at the upper end of screw thread 68 of shaft 62. Adjacent its lower margin, there is mounted within housing 74 a resilient or preloaded bearing element 100.

Normal amounts of dimensional variations may occur in mass manufacture of the individual parts such as the nut 72, housing 74, elements of the upper ball bearing including balls 84, etc. and it is desired to provide in combination with such parts a lower rotary bearing assembly under nut 72 which readily accommodates such variations via a resilient thrust take-up and preload function but, in line with our objects, does so with reduced overall physical bulk and with simplicity and less cost compared to prior art structures. Thus, bearing element 100 is a one piece body molded of low friction polymeric material selected to afford, in the instant embodiment, relatively frictionless relative rotation of nut 72, but also in general a high degree of toughness and dimensional stability under substantial forces thereon, yet a moderate amount of elasticity, for reasons to appear. An acetal, such as Delrin, impregnated with Teflon fibers has in one embodiment been found satisfactory for use. Bearing element 100 is molded with a main body portion 102 having a central aperture in part defining an annular bearing surface 104 complementary to bearing surface 89 of the nut 72 and engaged therewith. Main body 102 sustains substantially without deformation all expected axial loading on nut 72 as well as radial loads, and in concert with the selection of its material properties the main body is thus formed with substantial radial width and thickness. As seen best in FIGS. 4 and 5, main body 102 fits closely within a complementarily circular shaped open end of the major cavity of housing 74 to precisely locate the axis of nut 72, and a pair of tangs 106 project from the outer edge of the main body into complementarily shaped slots in the cavity defining wall of the housing to fix the bearing element 100 against rotation under torque applied to bearing surface 104.

Referring to FIGS. 4 through 6, axial thrust takeup and preload in bearing element 100 is derived from forming integrally with the main body 102 a substantially elastic portion or section thereunder. In a preferred form, such elastic section comprises a series of angularly spaced radially oriented legs 108 integral with the undersurface of main body 102. As molded, they are straight but with tapering thickness. To aid their deflectability in a bending mode, they are canted out of parallel with the axis of element 100. They are intended to engage at their ends directly with the upper surface of the upper slide 18. During the final installation of actuator 60 upon tightening of screws 76 into housing 74 indicated in FIG. 4, the housing is drawn from the broken line position where the legs just touch, flushly against such surface as shown in solid lines, and legs 108 are deflected elastically as indicated to impart an upward force on nut 72. Such bias or force causes the upper surface 88 of the nut to be pressed tightly against race 90 via bearing balls 84.

Considering the limited adaptability of the usual polymer materials to all these functions, means are further provided whereby the elasticity of legs 108 may not be exceeded during operation of actuator 60, thereby to insure its long and satisfactory operation. Specifically, abutments are incorporated to limit the deflection that the legs may undergo and in a preferred embodiment, such means are provided as molded stop lugs 110 depending integrally from the main body 102 to be engageable also directly with the upper surface of the upper slide 18. Referring to FIG. 4, the as-molded undeflected vertical dimension between the ends of legs 108 and the lower surface of stops 110, i.e., distance a, is such as to be greater than the worst condition of tolerance stackup along the axis of the various parts of actuator 60. Thus, upon final installation indicated in the solid lines in FIG. 4, some minimum amount of deflection of legs 108 will still be experienced so as to induce axial preload in the assembly. Stated another way, dimension b in FIG. 4 shall in any tolerance case be some significant amount smaller than dimension a. In a satisfactory embodiment, a minimum such significant amount equalling 0.05 mm yields a preload of 800 newtons developed in legs 108 forcing the nut 72 upwardly against ball race 90.

During operation, various loadings on shaft 62 tending to equal or overcome such preload and drive the shaft downwardly toward upper slide 18 are absorbed by legs 108. This may occur up to a predetermined value of stress in legs 108, beyond which bearing element 100 is adapted to experience engagement at the abutment stops. For example, a heavily loaded occupant seat 10 tending to stress legs 108 beyond such predetermined maximum will cause the stops 110 to bottom on the support surface of slide 18. Likewise, should shaft 62 be driven upwardly by worm 78 and nut 72 until the shoulder 94 thereof meets stop surface 92, the stall torque of the drive means imparted to worm 78 will cause a reverse drive of nut 72 downwardly on legs 108 beyond the preload provided therein again to cause stops 110 to engage the upper slide.

In this way the bearing element 100 and the overall combination of actuator 60 derives maximum advantage in the use of a molded polymeric bearing element having its own resiliency or preload function but without danger of failure under extended service. Further, it is seen that simplicity of fabrication is achieved and parts eliminated. The legs 108 fit directly against a support surface of the upper slide without the need for an intervening washer or housing wall. The thickness of ball race elements or the thickness of spacers for washer type springs which might be combined with a polymeric bearing torus, per se, are avoided and the axial space consumed normally thereby is freed for reducing the overall height of the actuator 60 and the seat adjuster 15. Configurations in the elastic portion other than the specifically disclosed legs 108 will now be apparent to the art as other applications of the broader spirit of the invention arise.

The embodiments of the invention in which an exclusive property or privilege is claimed are defined as follows:

1. An actuator comprising threadedly engaged screw and nut members, housing means defining an axis, one of said members disposed on said axis and having an axially spaced pair of bearing surfaces with one thereof mounted against the housing means, means defining a support surface adjacent the other of said bearing surfaces, the other of said members adapted to be connected with a load to be actuated, a one piece resilient bearing operative to preload said one member against the housing means with force applied up to a predetermined maximum axially thereof and comprising a molded body of low friction polymeric material formed with a main portion engaged with the other bearing surface of said one member and adapted to sustain substantially without deformation at least said predetermined force, said body being further formed with a yieldable portion engaged with said support surface and deflected along said axis under preload force a distance no greater than the distance corresponding to said predetermined force, abutment stop means operable under a force on said one member having an axial force at or greater than said predetermined force to limit deflection of said resilient bearing elastic portion, and drive torque means connected for rotation of one of said members to actuate the load.

2. An actuator comprising threadedly engaged screw and nut members, a housing including adjacent one end thereof a first rotary antifriction bearing centered on an axis of the housing, one of said members disposed for rotation on said axis and having an axially spaced pair of bearing surfaces with one thereof mounted against the first bearing, means defining a support surface adjacent the other end of said housing, the other of said members adapted to be connected with a load to be actuated, a one piece resilient bearing operative to preload said one member against the first bearing with force applied up to a predetermined maximum axially thereof, said bearing comprising a molded body of low friction polymeric material formed with a main portion engaged relatively rotatably with the other bearing surface of said one member and adapted to sustain substantially without deformation at least said predetermined force, yieldable leg means extending from said main portion and engaged at the distal end thereof with said support surface against relative rotation, said leg means being elastically deflected in the direction of said axis under preload force a distance no greater than the distance corresponding to said predetermined force, abutment stop means on said resilient bearing main portion and said support surface means engageable under a load on said one member or drive torque applied thereto having an axial force at or greater than said predetermined force whereby to limit deflection of said resilient bearing elastic portion, and drive torque means connected for rotation of said one member to actuate the load.

3. An actuator comprising threadedly engaged screw and nut members, housing means defining an axis and including a first rotary antifriction bearing centered theron, one of said members disposed for rotation on said axis and having an axially spaced pair of bearing surfaces with one thereof mounted against the first bearing, means defining a support surface adjacent the other of said bearing surfaces, the other of said members adapted to be connected with a load to be actuated, a one piece resilient bearing operative to preload said one member against the first antifriction bearing with force applied up to a predetermined maximum axially thereof, said bearing comprising a molded body of low friction polymeric material formed with a main portion engaged with the other bearing surface of said one member and adapted to sustain substantially without deformation at least said predetermined force, a yieldable portion under said main portion and engaged with said support surface, said yieldable portion being deflected along said axis under preload force up to a distance corresponding to said predetermined force, and abutment stops on said main portion engageable with said support surface under a load on said one member or drive torque applied thereto having an axial force at or greater than said predetermined force whereby to limit deflection of said resilient bearing elastic portion, and drive torque means connected for rotation of said one member to actuate the load.

4. A resilient bearing for supporting a surface of a rotating member upon an understructure in a yieldable manner under force applied up to a predetermined maximum value axially of said member, said bearing comprising a molded body of low friction polymeric material formed with a main bearing portion engaged with said surface and adapted to sustain substantially without deformation at least said predetermined force, yieldable leg means extending from said main portion and engageable at the distal end thereof with the understructure, said leg means being adapted to yield elastically under axial force on said member, and abutment stop means on said main portion of said body engageable with the understructure to establish force transmitting engagement therebetween upon predetermined deflection of said leg means corresponding to said predetermined maximum force.

5. A resilient bearing for supporting a surface of a rotating member upon an understructure in a yieldable manner under force applied up to a predetermined maximum value, said bearing comprising a molded body of low friction polymeric material formed with a main bearing portion defining an axis and engaged with said surface, said main portion being adapted to sustain substantially without deformation at least said predetermined force, a series of angularly spaced radially oriented legs about such axis extending from said main portion and engageable at the distal end thereof with the understructure, said legs being adapted to yield elastically under force applied along said axis on said member, and abutment stop means on said main portion of said body engageable with the understructure to establish force transmitting engagement therebetween upon predetermined deflection of said legs along said axis corresponding to said predetermined maximum force.

* * * * *